US012752604B2

(12) United States Patent
Movaghar et al.

(10) Patent No.: US 12,752,604 B2
(45) Date of Patent: Oct. 6, 2026

(54) COOLING SYSTEM, VEHICLE AND METHOD OF CONTROLLING COOLING SYSTEM

(71) Applicant: VOLVO TRUCK CORPORATION, Gothenburg (SE)

(72) Inventors: Amirreza Movaghar, Gothenburg (SE); Masih Khoshab, Alingsås (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 280 days.

(21) Appl. No.: 18/606,593

(22) Filed: Mar. 15, 2024

(65) Prior Publication Data

US 2024/0336118 A1 Oct. 10, 2024

(30) Foreign Application Priority Data

Apr. 6, 2023 (EP) .................................... 23166932

(51) Int. Cl.
*B60H 1/32* (2006.01)
*B60H 1/00* (2006.01)

(52) U.S. Cl.
CPC ......... *B60H 1/323* (2013.01); *B60H 1/00278* (2013.01); *B60H 1/3205* (2013.01); *B60H 1/32281* (2019.05)

(58) Field of Classification Search
CPC .. B60H 1/323; B60H 1/00278; B60H 1/3205; B60H 1/32281; B60H 1/3227;
(Continued)

(56) References Cited

U.S. PATENT DOCUMENTS 10,293,706 B2 5/2019 Porras et al.
2018/0178615 A1* 6/2018 Xia .................... H01M 10/486

FOREIGN PATENT DOCUMENTS

DE 102007004979 A1 8/2008
DE 102019008847 A1 6/2021
(Continued)

OTHER PUBLICATIONS

European Communication pursuant to Article 94(3) EPC dated Jul. 9, 2025 in corresponding European Patent Application No. 23166932.6, 4 pages.
(Continued)

*Primary Examiner* — Elizabeth J Martin
*Assistant Examiner* — Adam Dorrel Moore
(74) *Attorney, Agent, or Firm* — Jeffri A. Kaminski; Venable LLP

(57) ABSTRACT

A cooling system has a primary stage; and a secondary stage including a secondary pressure reducing device configured to adopt a passive state and an active state, a cooling section for cooling an electric storage device, a pump, a secondary compressor, and a valve device arranged to selectively direct the refrigerant to the pump or to the secondary compressor. The secondary stage is controlled to operate in a first mode where the secondary pressure reducing device adopts the passive state, and the valve device directs the refrigerant to the pump; and control the secondary stage to operate in a second mode where the secondary pressure reducing device adopts the active state, and the valve device directs the refrigerant to the secondary compressor. In the second mode, the refrigerant is conveyed by the secondary stage is condensed in cooperation with the primary stage.

14 Claims, 12 Drawing Sheets

(58) Field of Classification Search
CPC ...... B60H 2001/00307; B60H 1/00385; B60H 1/32284
See application file for complete search history.

(56) References Cited

FOREIGN PATENT DOCUMENTS

| | | | |
|---|---|---|---|
| FR | 3071048 | A1 | 3/2019 |
| WO | 2016076809 | A1 | 5/2016 |

OTHER PUBLICATIONS

Extended European Search Report in corresponding European Application No. 23166932.6 dated Sep. 26, 2023 (5 pages).

* cited by examiner

COOLING SYSTEM, VEHICLE AND METHOD OF CONTROLLING COOLING SYSTEM

TECHNICAL FIELD

The disclosure relates generally to cooling systems. In particular aspects, the disclosure relates to a cooling system, a vehicle and a method of controlling a cooling system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In vehicles where propulsion is provided at least partially by an electric motor, such as in electric or hybrid vehicles, an electric storage device is typically used to provide electric power to the electric motor. The electric storage device may for example comprise a battery pack containing a plurality of battery cells. By connecting such battery cells in parallel and/or in series, a desired voltage capacity and power capacity can be achieved.

To improve the lifetime of the electric storage device at high ambient temperatures, the electric storage device requires cooling. This can be achieved by a forced or convective stream of air around the electric storage device or by pumping a liquid coolant through a coolant circuit comprising a heat exchanger for cooling the electric storage device.

SUMMARY

According to a first aspect of the disclosure, there is provided a cooling system for cooling an electric storage device in a vehicle, the cooling system comprising a primary stage including a primary compressor, a condenser downstream of the primary compressor, a primary pressure reducing device downstream of the condenser, and an evaporator downstream of the primary pressure reducing device arranged in a primary circuit; a secondary stage arranged to convey a refrigerant, the secondary stage including a secondary pressure reducing device configured to adopt a passive state, and an active state providing a larger pressure drop of the refrigerant than in the passive state, a cooling section downstream of the secondary pressure reducing device for cooling the electric storage device, a pump, a secondary compressor arranged in parallel with the pump, and a valve device downstream of the cooling section arranged to selectively direct the refrigerant to the pump or to the secondary compressor; and a computer system comprising processing circuitry. The processing circuitry is configured to control the secondary stage to operate in a first mode by controlling the secondary pressure reducing device to adopt the passive state, and by controlling the valve device to direct the refrigerant to the pump; and control the secondary stage to operate in a second mode by controlling the secondary pressure reducing device to adopt the active state, and by controlling the valve device to direct the refrigerant to the secondary compressor; wherein the cooling system is configured such that in the second mode, the refrigerant conveyed by the secondary stage is condensed in cooperation with the primary stage.

The first aspect of the disclosure may seek to provide an improved cooling system. Since a compressor is provided in each of the primary stage and the secondary stage, both the primary stage and the secondary stage may operate as a compression cycle. When both the primary compressor and the secondary compressor are driven, the primary stage may operate at relatively high pressure levels and the secondary stage may operate at relatively low pressure levels, lower than the relatively high pressure levels. The relatively low pressure of the refrigerant in the cooling section may enable an increased latent heat of vaporization. A technical benefit may thus include a more efficient cooling of the electric storage device. This technical benefit may be particularly useful to handle a thermal runaway in the electric storage device. A further technical benefit may therefore include an improved safety.

The cooling system may enable operations at at least three different pressure levels. A further technical benefit may therefore include an improved energy efficiency of the cooling system.

Optionally in some examples, the primary stage operates at a high-pressure level and at a medium-pressure level, lower than the high-pressure level, and the secondary stage operates at the medium pressure level and at a low-pressure level, lower than the medium-pressure level. In these examples, the medium-pressure level may be set independently of the low-pressure level. Moreover, in these examples, the medium-pressure level may be set based on a cooling requirement of the evaporator, e.g., for cooling a passenger compartment, and the low-pressure level may be set based on a cooling requirement of the cooling section, i.e., for cooling the electric storage device. Due to this independency, the cooling capacity provided by the cooling system at the cooling section can be provided independently of at least one other cooling requirement.

Moreover, a prior art cooling system may already comprise a primary compressor, a condenser, a primary pressure reducing device, an evaporator, a cooling section and a pump. The prior art cooling system may therefore be modified into the cooling system according to the first aspect by relatively small, but surprisingly advantageous, modifications. Optionally in some examples, a modification of some prior art cooling system into the cooling system according to the first aspect may comprise adding the secondary pressure reducing device, the secondary compressor and the valve device, and providing a computer system configured to control the secondary pressure reducing device and the valve device in accordance with the first and second modes. A further technical benefit may therefore include an efficient installation of the cooling system, such as a possibility to retrofit the cooling system of the first aspect in an existing cooling system.

The electric storage device may comprise a plurality of battery cells. Optionally in some examples, the electric storage device is a battery pack comprising a plurality of battery cells. The battery pack may comprise a plurality of battery modules, where each battery module comprises a plurality of battery cells.

A refrigerant may be provided in the primary stage. The refrigerant in the primary stage may either be the same refrigerant as in the secondary stage, or a different refrigerant. The condenser may be cooled by ambient air. The primary pressure reducing device may comprise a pressure reducer, such as an expansion valve. The primary circuit may operate at two different pressure levels.

When the secondary stage operates in the first mode, the secondary stage may operate at one single pressure level, or substantially at one single pressure level. When the secondary stage operates in the second mode, the secondary stage may operate at two different pressure levels.

The secondary stage may comprise a first line between the cooling section and the pump. The valve device may be a first three-way valve positioned on the first line. When the valve device directs the refrigerant to the secondary compressor, at least a part of the first line may be bypassed. When the valve device directs the refrigerant to the pump, this part of the first line may not be bypassed. The valve device may adopt a first state to direct the refrigerant to the secondary compressor, and a second state to direct the refrigerant to the pump.

The secondary pressure reducing device may comprise a pressure reducer, such as an expansion valve. The secondary pressure reducing device may further comprise a second three-way valve. The secondary stage may comprise a second line extending through the secondary pressure reducing device and to the cooling section. When the secondary pressure reducing device adopts the active state, at least a part of the second line may be bypassed, e.g., by the second three-way valve. When the secondary pressure reducing device adopts the passive state, this part of the second line may not be bypassed, e.g., by the second three-way valve.

In alternative examples, the secondary pressure reducing device may be constituted by a pressure reducer. In the passive state, the pressure reducer may provide a large opening such that no, or substantially no, pressure drop of the refrigerant occurs through the pressure reducer. In the active state, the pressure reducer may provide a small opening such that a larger pressure drop of the refrigerant occurs through the pressure reducer.

Optionally in some examples, the cooling section is a heat exchanger arranged to exchange heat with the electric storage device. The cooling section may for example comprise one or more cooling plates.

The processing circuitry is configured to control the secondary stage to operate in either the first mode or in the second mode. The processing circuitry may be configured to control the secondary stage to operate in the second mode upon detection of an event requiring high cooling of the electric storage device. Examples of such events comprise a thermal runaway in the electric storage device, high temperatures of ambient air and high performance conditions of the electric storage device. Examples of high performance conditions of the electric storage device comprise fast charging and high power modes. When high cooling is not required for the electric storage device, the processing circuitry may control the secondary stage to operate in the first mode.

The primary and secondary stages may alternatively be referred to as primary and secondary parts, respectively, or primary and secondary sections, respectively.

Optionally in some examples, in the second mode, a pressure immediately downstream of the secondary pressure reducing device is at least 20% lower than a pressure immediately downstream of the primary pressure reducing device.

Optionally in some examples, in the second mode, the primary stage operates in a primary pressure range and the secondary stage operates in a secondary pressure range, and wherein all pressures of the primary pressure range are equal to or higher than all pressures of the secondary pressure range.

Optionally in some examples, the processing circuitry is configured to control the secondary stage to operate in the second mode based on data indicative of a thermal runaway in the electric storage device. Optionally in some examples, the cooling system comprises a temperature sensor providing temperature data indicative of a temperature of the electric storage device. In these examples, the processing circuitry may be configured to control the secondary stage to operate in the second mode based on this temperature data. Data indicative of a thermal runaway in the electric storage device may comprise temperature data indicative of a temperature of the electric storage device above a threshold value, for example 500° C.

Optionally in some examples, the cooling system further comprises a duct having an outlet for blowing air towards a passenger compartment. In these examples, the evaporator may be arranged to cool air flowing in the duct.

Optionally in some examples, the secondary pressure reducing device, the cooling section, the pump, the secondary compressor and the valve device are arranged in a secondary circuit. In these examples, the refrigerant may be a first refrigerant contained in the secondary circuit, and wherein the primary circuit may contain a second refrigerant, fluidically separated from the first refrigerant. A technical benefit may include the possibility to use different refrigerants in the primary circuit and in the secondary circuit.

Optionally in some examples, the cooling system further comprises a heat exchanger arranged to exchange heat between the first refrigerant and the second refrigerant. In this way, the second refrigerant is condensed by the heat exchanger. This is thus one example of condensing refrigerant conveyed by the secondary stage in cooperation with the primary stage. The heat exchanger may be positioned upstream of the primary compressor in the primary circuit and downstream of each of the pump and the secondary compressor in the secondary circuit. The heat exchanger may for example be a chiller.

In these examples, the primary pressure reducing device may be a first primary pressure reducing device. Moreover, in these examples, the primary stage may further comprise a second primary pressure reducing device upstream of the heat exchanger.

According to a second aspect, there is provided a vehicle comprising the cooling system according to the first aspect. The condenser may be positioned in a front section of the vehicle.

The second aspect of the disclosure may seek to provide an improved vehicle.

Optionally in some examples, the vehicle further comprises a passenger compartment. In these examples, the evaporator may be arranged to cool air flowing in the duct.

According to a third aspect, there is provided a method of controlling a cooling system for cooling an electric storage device in a vehicle, the method comprising providing a cooling system comprising a primary stage including a primary compressor, a condenser downstream of the primary compressor, a primary pressure reducing device downstream of the condenser, and an evaporator downstream of the primary pressure reducing device arranged in a primary circuit; a secondary stage arranged to convey a refrigerant, the secondary stage including a secondary pressure reducing device configured to adopt a passive state, and an active state providing a larger pressure drop of the refrigerant than in the passive state, a cooling section downstream of the secondary pressure reducing device for cooling the electric storage device, a pump, a secondary compressor arranged in parallel with the pump, and a valve device downstream of the cooling section arranged to selectively direct the refrigerant to the pump or to the secondary compressor; controlling, by processing circuitry of a computer system, the secondary stage to operate in a first mode by controlling the secondary pressure reducing device to adopt the passive state, and by controlling the valve device to direct the refrigerant to the pump; and controlling, by the processing circuitry, the secondary stage to operate in a second mode by controlling the secondary pressure reducing device to adopt the active state, and by controlling the valve device to direct the refrigerant to the secondary compressor; wherein in the second mode, the refrigerant conveyed by the secondary stage is condensed in cooperation with the primary stage.

The third aspect of the disclosure may seek to provide an improved method of controlling a cooling system.

Optionally in some examples, in the second mode, a pressure immediately downstream of the secondary pressure reducing device is at least 20% lower than a pressure immediately downstream of the primary pressure reducing device.

Optionally in some examples, in the second mode, the primary stage operates in a primary pressure range and the secondary stage operates in a secondary pressure range. In these examples, all pressures of the primary pressure range may be equal to or higher than all pressures of the secondary pressure range.

Optionally in some examples, the method further comprises controlling, by the processing circuitry, the secondary stage to operate in the second mode in response to data indicative of a thermal runaway in the electric storage device.

Optionally in some examples, the method further comprises controlling, by the processing circuitry, a fan to blow air through a duct having an outlet towards a passenger compartment of the vehicle, wherein the evaporator is arranged to cool air flowing in the duct.

Optionally in some examples, the secondary pressure reducing device, the cooling section, the pump, the secondary compressor and the valve device are arranged in a secondary circuit. In these examples, the refrigerant may be a first refrigerant contained in the secondary circuit, and the primary circuit may contain a second refrigerant, fluidically separated from the first refrigerant.

The disclosed aspects, examples (including any preferred examples), and/or accompanying claims may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

A conventional cooling system may include a primary circuit and a secondary circuit. The primary circuit may comprise a compressor, a condenser and a primary pressure reducing device and an evaporator. The secondary circuit may comprise a cooling section and a pump. In such conventional cooling system, the secondary circuit always operates at pressure levels above an ambient pressure. Therefore, the cooling section can only provide a limited cooling capacity. By modifying the conventional cooling system to comprise a secondary compressor and a secondary pressure reducing device in a secondary stage, the primary stage may operate at relatively high pressure levels and the secondary stage may operate at relatively low pressure levels, lower than the relatively high pressure levels. The relatively low pressure of the refrigerant in the cooling section may enable an increased latent heat of vaporization. A technical benefit may thus include a more efficient cooling of the electric storage device.

Figure 1:
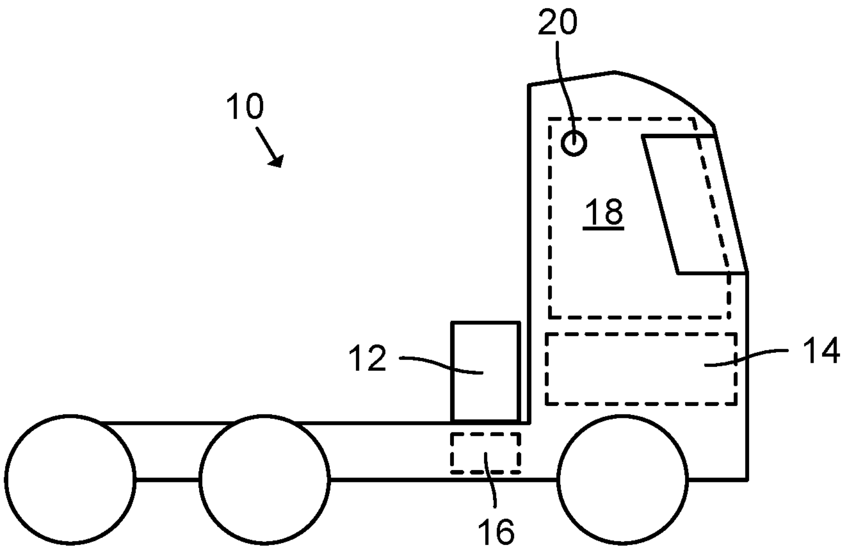
FIG. 1 is an exemplary view of a vehicle according to an example.

FIG. 1 is an exemplary view of a vehicle 10 according to an example. The vehicle 10 comprises an electric storage device 12 and a cooling system 14. The electric storage device 12 may comprise a plurality of battery cells (not illustrated). The electric storage device 12 may comprise, or be constituted by, a battery pack comprising a plurality of battery modules. In this case, each battery module may comprise a plurality of battery cells.

The vehicle 10 in FIG. 1 further comprises an electric motor 16. The electric motor 16 is arranged to provide propulsion of the vehicle 10. The electric motor 16 is electrically powered by the electric storage device 12.

The vehicle 10 of this example further comprises a passenger compartment 18, such as a cabin. The vehicle 10 further comprises a temperature sensor 20 for providing temperature data indicative of a temperature in the passenger compartment 18.

Figure 2:
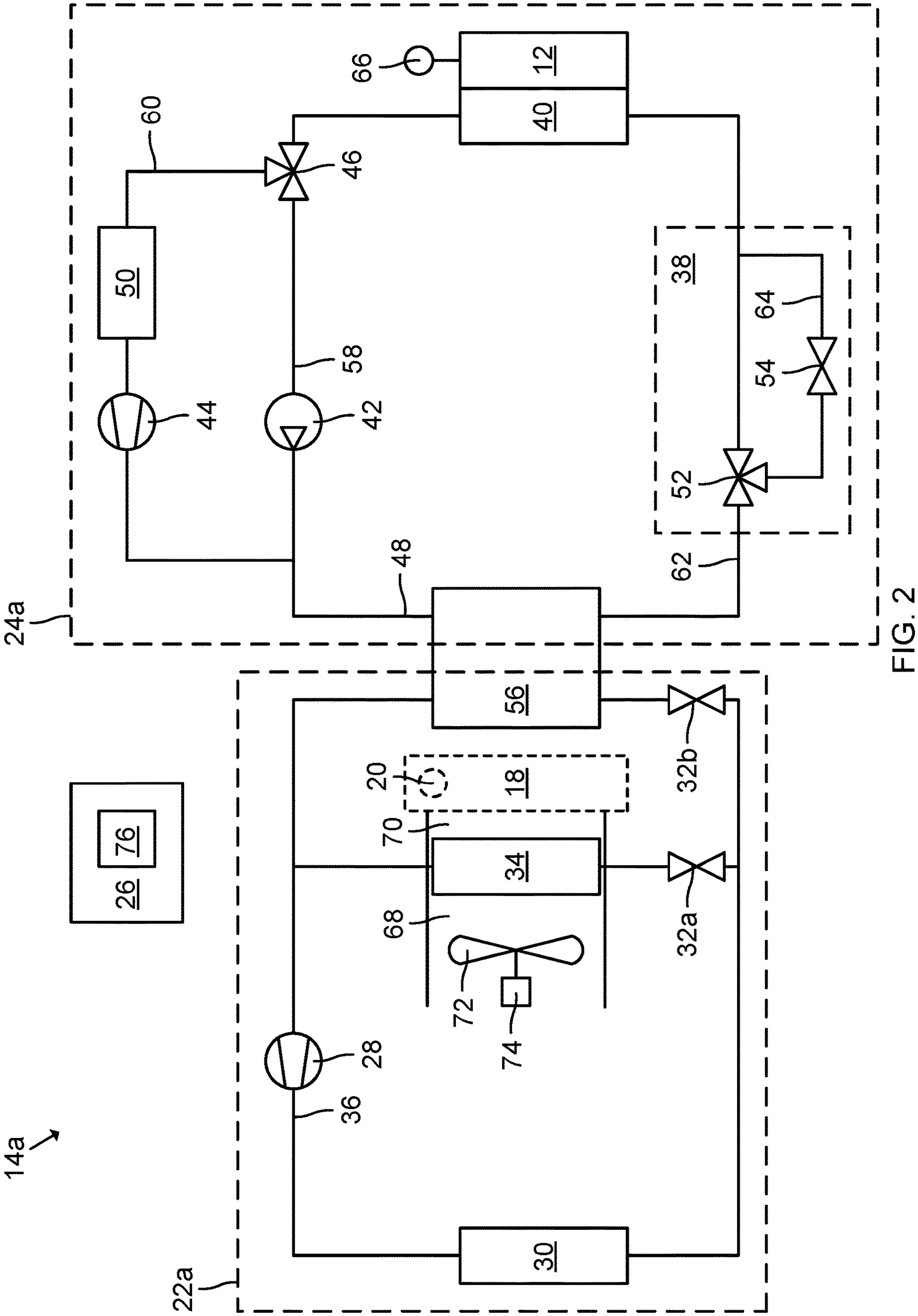
FIG. 2 is an exemplary view of a cooling system according to an example.

FIG. 2 is an exemplary view of a cooling system **14*a* according to an example. The cooling system 14*a* may be used as the cooling system 14 in the vehicle 10. The cooling system 14*a* is configured to cool the electric storage device 12 and the passenger compartment 18. The cooling system 14*a* comprises a primary stage 22*a*, a secondary stage 24*a* and a computer system 26**.

The primary stage 22*a* of this example comprises a primary compressor 28, a condenser 30 arranged downstream of the primary compressor 28, a first primary expansion valve 32*a* arranged downstream of the primary compressor 28, and an evaporator 34 arranged downstream of the first primary expansion valve 32*a*. The primary compressor 28, the condenser 30, the first primary expansion valve 32*a* and the evaporator 34 are arranged in a primary circuit 36. The condenser 30 may be positioned in a front section of the vehicle 10.

The primary stage 22*a* of this specific and non-limiting example further comprises a second primary expansion valve 32*b* arranged downstream of the condenser 30. Also the second primary expansion valve 32*b* is provided in the primary circuit 36. The first and second primary expansion valves 32*a*, 32*b* are examples of primary pressure reducing devices according to the disclosure.

The secondary stage 24*a* of this example comprises a secondary pressure reducing device 38, a cooling section 40 arranged downstream of the secondary pressure reducing device 38, a pump 42, a secondary compressor 44, and a first valve device 46 arranged downstream of the cooling section 40. In this example, the secondary pressure reducing device 38, the cooling section 40, the pump 42, the secondary compressor 44 and the first valve device 46 are arranged in a secondary circuit 48. The primary circuit 36 is fluidically separated from the secondary circuit 48.

Each of the pump 42 and the secondary compressor 44 is arranged downstream of the cooling section 40. The pump 42 and the secondary compressor 44 are also arranged in parallel.

The cooling section 40 is arranged to cool the electric storage device 12. To this end, the cooling section 40 may for example be a heat exchanger arranged to exchange heat with the electric storage device 12.

The secondary stage 24*a* of this example further comprises a phase separator 50. The phase separator 50 may for example be an accumulator.

In this example, a first refrigerant is provided in the primary circuit 36 and a second refrigerant is provided in the secondary circuit 48. Each of the primary stage 22*a* and the secondary stage 24*a* is thus arranged to convey a refrigerant. The first refrigerant may for example be 1,1,1,2-Tetrafluoroethane (R-134a) refrigerant. The second refrigerant may be of the same type as the first refrigerant. Alternatively, the second refrigerant may comprise a solution of water and ethylene glycol. Such solution may provide a higher latent heat of vaporization.

The first valve device 46 is arranged to selectively direct the refrigerant to either the pump 42 or to the secondary compressor 44. To this end, the first valve device 46 may for example be a three-way valve.

The secondary pressure reducing device 38 of this example comprises a second valve device 52 and a secondary expansion valve 54. The second valve device 52 is arranged to selectively direct the refrigerant to the secondary expansion valve 54. To this end, the second valve device 52 may for example be a three-way valve.

The cooling system 14*a* of this example further comprises a heat exchanger 56. The heat exchanger 56 is arranged to exchange heat between the primary circuit 36 and the secondary circuit 48. The heat exchanger 56 is here arranged downstream of the second primary expansion valve 32*b* and upstream of the primary compressor 28 in the primary circuit 36. Moreover, the heat exchanger 56 is here arranged downstream of the pump 42 and the secondary compressor 44 and upstream of the secondary pressure reducing device 38 in the secondary circuit 48.

The secondary stage 24*a* of this example comprises a first line 58 and a first bypass line 60. The first line 58 extends from the cooling section 40 to the heat exchanger 56. The first valve device 46 and the pump 42 are arranged on the first line 58. The first bypass line 60 extends from the first valve device 46 to a portion of the first line 58 downstream of the pump 42. The first bypass line 60 thus bypasses a part of the first line 58. The secondary compressor 44, and here also the phase separator 50, are arranged on the first bypass line 60.

The secondary stage 24*a* of this example comprises a second line 62 and a second bypass line 64. The second line 62 extends from the heat exchanger 56 to the cooling section 40. The second valve device 52 is arranged on the second line 62. The second bypass line 64 extends from the second valve device 52 to a portion of the second line 62 downstream of the second valve device 52. The second bypass line 64 thus bypasses a part of the second line 62. The secondary expansion valve 54 is here arranged on the second bypass line 64.

The cooling system 14*a* of this example further comprises a temperature sensor 66. The temperature sensor 66 provides temperature data indicative of a temperature of the electric storage device 12.

The cooling system 14*a* of this example further comprises a duct 68. The duct 68 comprises an outlet 70. The cooling system 14*a* of this example further comprises a fan 72 and a fan motor 74 for driving the fan 72. The fan 72 is here arranged in the duct 68. The outlet 70 is provided in the passenger compartment 18. Air flowing in the duct 68 is cooled by the evaporator 34 to provide a cooled airflow to the passenger compartment 18.

The computer system 26 comprises processing circuitry 76. The processing circuitry 76 of this example is configured to control the primary compressor 28, the first primary expansion valve 32*a* and the second primary expansion valve 32*b* of the primary stage 22*a*. Moreover, the processing circuitry 76 of this example is configured to control the first valve device 46, the pump 42, the secondary compressor 44, the second valve device 52 and the secondary expansion valve 54. The processing circuitry 76 may also be configured to control the fan motor 74.

The computer system 26 of this example also receives temperature data from the temperature sensor 20 indicative of a temperature in the passenger compartment 18, and temperature data from the temperature sensor 66 indicative of a temperature of the electric storage device 12.

Figure 3:
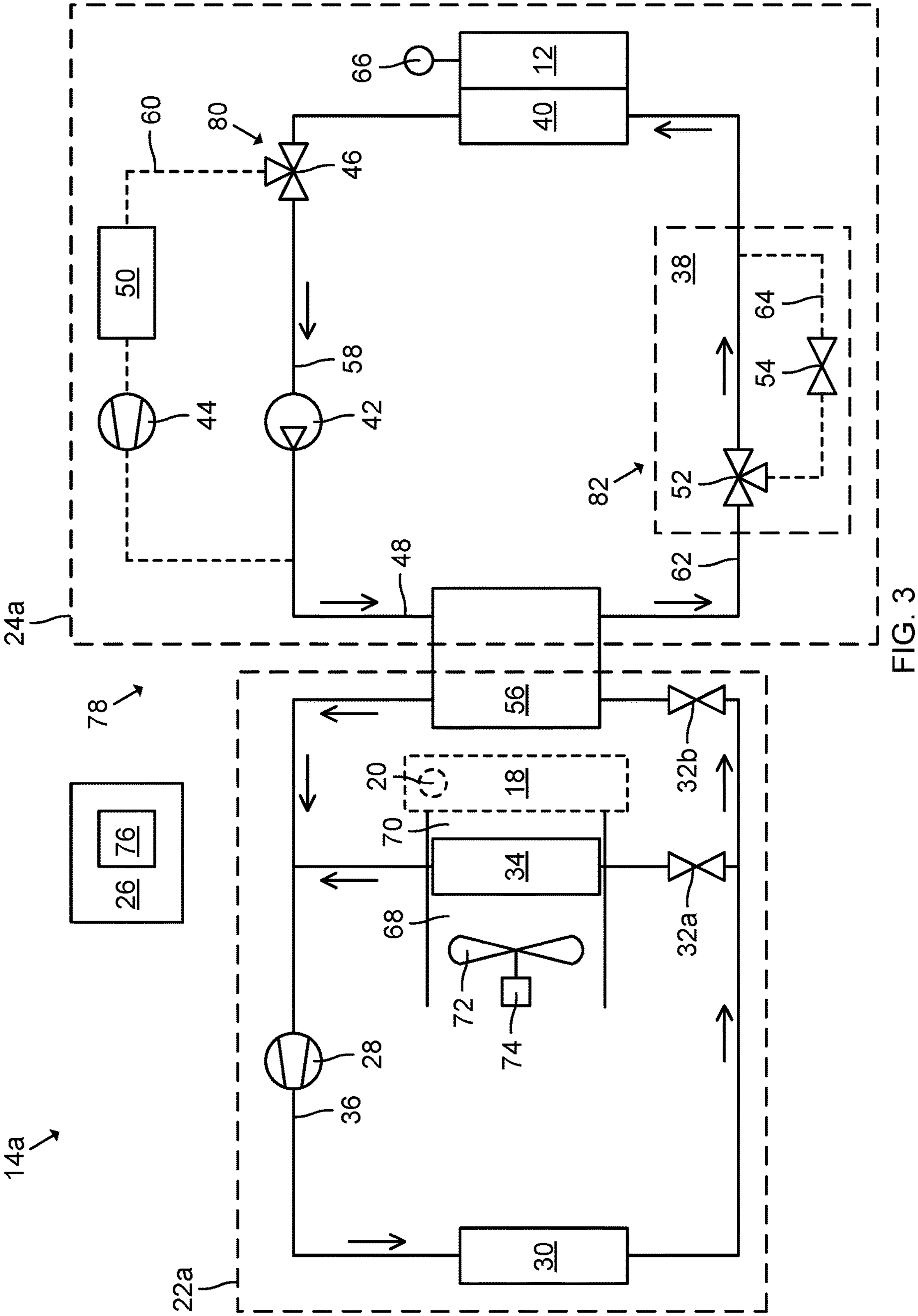
FIG. 3 is an exemplary view of the cooling system in FIG. 2 when a secondary stage operates in a first mode according to an example.

FIG. 3 is an exemplary view of the cooling system 14*a* in FIG. 2. In FIG. 3, the processing circuitry 76 controls the secondary stage 24*a* to operate in a first mode 78 according to an example. In the first mode 78, the cooling system 14*a* functions as a conventional cooling system.

FIG. 3 illustrates the refrigerant flows in the primary and secondary circuits 36, 48. In contrast to the flows in the secondary circuit 48, the flows in the primary circuit 36 are not specific for the first mode 78. In the primary circuit 36, the primary compressor 28 forces the refrigerant to the condenser 30. The refrigerant then reaches each of the first and second primary expansion valves 32*a*, 32*b* downstream of the condenser 30. The refrigerant then reaches the evaporator 34 downstream of the first primary expansion valve 32*a* and the heat exchanger 56 downstream of the second primary expansion valve 32*b*. The refrigerant from each of the evaporator 34 and the heat exchanger 56 then returns to the primary compressor 28.

In the first mode 78, the processing circuitry 76 controls the first valve device 46 to adopt a first state 80. In the first state 80, the first valve device 46 only passes refrigerant through the first line 58, and not through the first bypass line 60. That is, the first valve device 46 only passes refrigerant from the cooling section 40 to the pump 42, and not to the secondary compressor 44. The first bypass line 60 and the secondary compressor 44 are thereby bypassed. In this example, also the phase separator 50 is bypassed.

Moreover, in the first mode 78, the processing circuitry 76 controls the secondary pressure reducing device 38 to adopt a passive state 82. In this example, the processing circuitry 76 controls the second valve device 52 to only pass refrigerant through the second line 62, and not through the second bypass line 64. The secondary expansion valve 54 is thereby bypassed. There is thus a very small, if any, pressure drop of the refrigerant over the secondary pressure reducing device 38.

In the first mode 78, the pump 42 forces the refrigerant to the heat exchanger 56. The refrigerant then reaches the second valve device 52 downstream of the heat exchanger 56. The refrigerant then reaches the cooling section 40 downstream of the second valve device 52. The refrigerant then reaches the first valve device 46 downstream of the cooling section 40 before returning to the pump 42.

Figure 4:
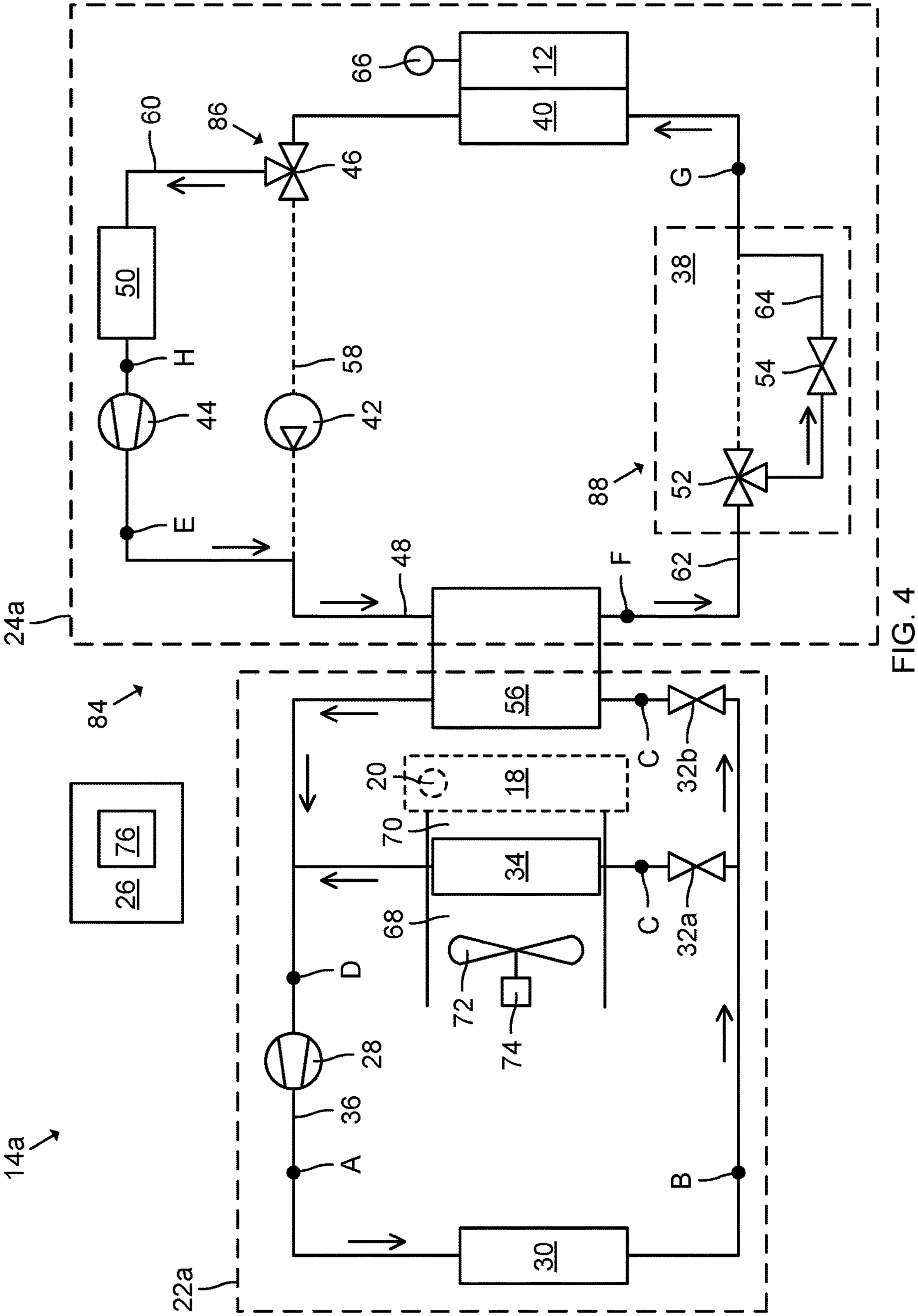
FIG. 4 is an exemplary view of the cooling system in FIG. 2 when the secondary stage operates in a second mode according to an example.

FIG. 4 is an exemplary view of the cooling system 14*a* in FIG. 2. In FIG. 4, the processing circuitry 76 controls the secondary stage 24*a* to operate in a second mode 84 according to an example. In contrast to the first mode 78, the secondary stage 24*a* operates as a compression cycle in the second mode 84. The processing circuitry 76 may for example switch the control of the secondary stage 24*a* from the first mode 78 to the second mode 84 upon detection of an event requiring high cooling of the electric storage device 12. To this end, the processing circuitry 76 may determine whether to control the secondary stage 24*a* in the first mode 78 or in the second mode 84 based on the temperature data from the temperature sensor 66.

In the second mode 84, the processing circuitry 76 controls the first valve device 46 to adopt a second state 86. In the second state 86, the first valve device 46 leads refrigerant from the cooling section 40 into the first bypass line 60 where it reaches the secondary compressor 44, and here also the phase separator 50 upstream of the secondary compressor 44. A part of the first line 58 including the pump 42 is thereby bypassed.

Moreover, in the second mode 84, the processing circuitry 76 controls the secondary pressure reducing device 38 to adopt an active state 88. In this example, the processing circuitry 76 controls the second valve device 52 to pass refrigerant through the second bypass line 64 such that a part of the second line 62 is bypassed. The refrigerant is thereby passed through the secondary expansion valve 54. Due to the refrigerant passing through the secondary expansion valve 54, there is a relatively high pressure drop of the refrigerant over the secondary pressure reducing device 38 in the active state 88 in comparison with the passive state 82.

In the second mode 84, the secondary compressor 44 forces the refrigerant to the heat exchanger 56. The refrigerant then reaches the second valve device 52. By virtue of the second valve device 52, the refrigerant is led through the second bypass line 64 and thus bypasses a portion of the second line 62. The refrigerant is thereby led through the secondary expansion valve 54. In the secondary expansion valve 54, the pressure and temperature of the refrigerant drops. The refrigerant then reaches the cooling section 40, then the first valve device 46, and in this example also the phase separator 50 downstream of the first valve device 46, before returning to the secondary compressor 44.

FIG. 4 further shows a plurality of points A-H of operation. The primary stage 22*a* comprises points A-D. The secondary stage 24*a* comprises points E-H.

In the primary stage 22*a*, point A is between the primary compressor 28 and the condenser 30, point B is between the condenser 30 and the first primary expansion valve 32*a*, one point C is between the first primary expansion valve 32*a* and the evaporator 34, one point C is between the second primary expansion valve 32*b* and the heat exchanger 56, and point D is upstream of the primary compressor 28 and downstream of each of the evaporator 34 and the heat exchanger 56. The refrigerant in the primary stage 22*a* undergoes a pressure increase in the primary compressor 28, condensation in the condenser 30, a pressure decrease in each of the first and second primary expansion valves 32*a*, 32*b*, and vaporization in each of the evaporator 34 and the heat exchanger 56. The pressures, temperatures and saturations of the refrigerant are the same in both points C.

In the secondary stage 24*a*, point E is between the secondary compressor 44 and the heat exchanger 56, point F is between the heat exchanger 56 and the secondary pressure reducing device 38, point G is between the secondary pressure reducing device 38 and the cooling section 40 and point H is between the cooling section 40 and the secondary compressor 44, here between the phase separator 50 and the secondary compressor 44. The refrigerant in the secondary stage 24*a* undergoes a pressure increase in the secondary compressor 44, condensation in the heat exchanger 56, a pressure decrease in the secondary pressure reducing device 38 (here in the secondary expansion valve 54), and vaporization in the cooling section 40. In this example, the refrigerant in the secondary stage 24*a* also undergoes phase separation in the phase separator 50 such that only, or substantially only, vapor refrigerant is led to the secondary compressor 44. Thus, in the phase separator 50, the vapor phase of the refrigerant is separated from the liquid phase of the refrigerant. The phase separator 50 thus prevents the secondary compressor 44 from sucking liquid refrigerant.

Between the secondary pressure reducing device 38 and the cooling section 40, the refrigerant is in a multiphase state. In the cooling section 40, the latent heat of vaporization of the refrigerant is used to cool the electric storage device 12. In this process, the pressure and the temperature of the refrigerant stay constant and heat from the electric storage device 12 is picked up by vaporization of the refrigerant.

Figure 5:
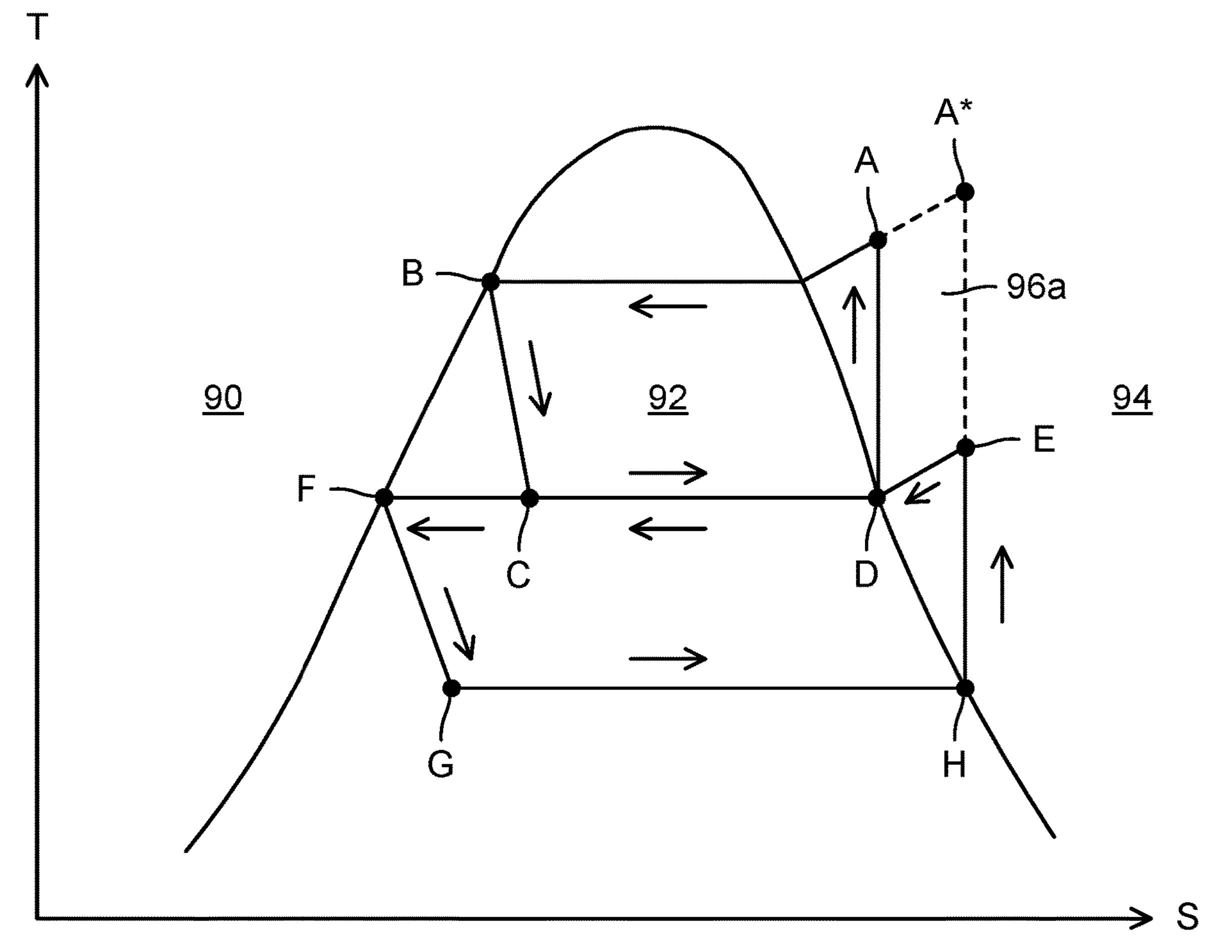
FIG. 5 is an exemplary view of a temperature-entropy diagram according to an example.

FIG. 5 is an exemplary view of a temperature-entropy diagram according to an example. More specifically, FIG. 5 shows the temperature T as a function of entropy S of the refrigerant in each of the primary and secondary stages 22*a*, 24*a*. In FIG. 5, the points A-D of operation of the refrigerant in the primary stage 22*a* and the points E-H of operation of the refrigerant in the secondary stage 24*a* are shown. FIG. 5 further shows a liquid region 90, a liquid-vapor region 92 and a vapor region 94.

The line between points A and B represents a high-pressure level. The line between E and F (including the line between points C and D) represents a medium-pressure level, lower than the high-pressure level. The line between points G and H represents a low-pressure level, lower than the medium-pressure level. The cooling system 14*a* can thus provide three distinct pressure levels. The high-pressure level may be at least 20% larger, such as at least 50% larger, than the medium-pressure level. The low-pressure level may be at least 20% smaller, such as at least 50% smaller, than the medium-pressure level. The primary stage 22*a* operates between the medium-pressure level and the high-pressure level. The secondary stage 24*a* operates between the low-pressure level and the medium-pressure level.

As can be gathered from FIG. 5, the pressure at point G immediately downstream of the secondary pressure reducing device 38 is substantially lower than the pressure at point C immediately downstream of the first primary expansion valve 32*a*, such as at least 20% lower.

The pressure levels may for example be controlled by controlling the first primary expansion valve 32*a*, the second primary expansion valve 32*b* and the secondary expansion valve 54. An opening of each of the first primary expansion valve 32*a*, the second primary expansion valve 32*b* and the secondary expansion valve 54 may for example be controlled to change, e.g., continuously or stepwise. To this end, the processing circuitry 76 may control each of the first primary expansion valve 32*a*, the second primary expansion valve 32*b* and the secondary expansion valve 54 with pulse-width modulation (PWM) control. Alternatively, or in addition, the processing circuitry 76 may control the primary compressor 28, the pump 42 and the secondary compressor 44 to change the pressure levels, e.g., by PWM control. In any case, the pressure levels may be controlled by the processing circuitry 76.

The refrigerant vaporizes much easier at lower pressure levels because the latent heat of vaporization significantly increases with decreasing pressure. Conversely, the refrigerant condenses much easier at higher pressure levels because the latent heat of vaporization decreases significantly with increasing pressure.

Since the relatively low pressure of the refrigerant in the cooling section 40 enables an increased latent heat of vaporization, the cooling capacity of the cooling system 14*a* is drastically increased when the secondary stage 24*a* is controlled in the second mode 84. That is, a very high amount of heat can be absorbed by the refrigerant passing through the cooling section 40. The high amount of latent heat of vaporization in the second mode 84 may for example be used to suppress a thermal runaway in the electric storage device 12. The cooling system 14*a* thus constitutes an adaptive compression cooling system suitable for suppressing thermal runaways in the electric storage device 12.

FIG. 5 further shows a point A* of operation of the refrigerant for comparison purposes. If the pressure of the refrigerant would be increased from point H to point A* using a single compressor, an increased work would be required. However, due to the cooling system 14*a* comprising the primary compressor 28 in the primary stage 22*a* and the secondary compressor 44 in the secondary stage 24*a*, less work is required. The work reduction is illustrated by area 96*a* in FIG. 5.

Figure 6:
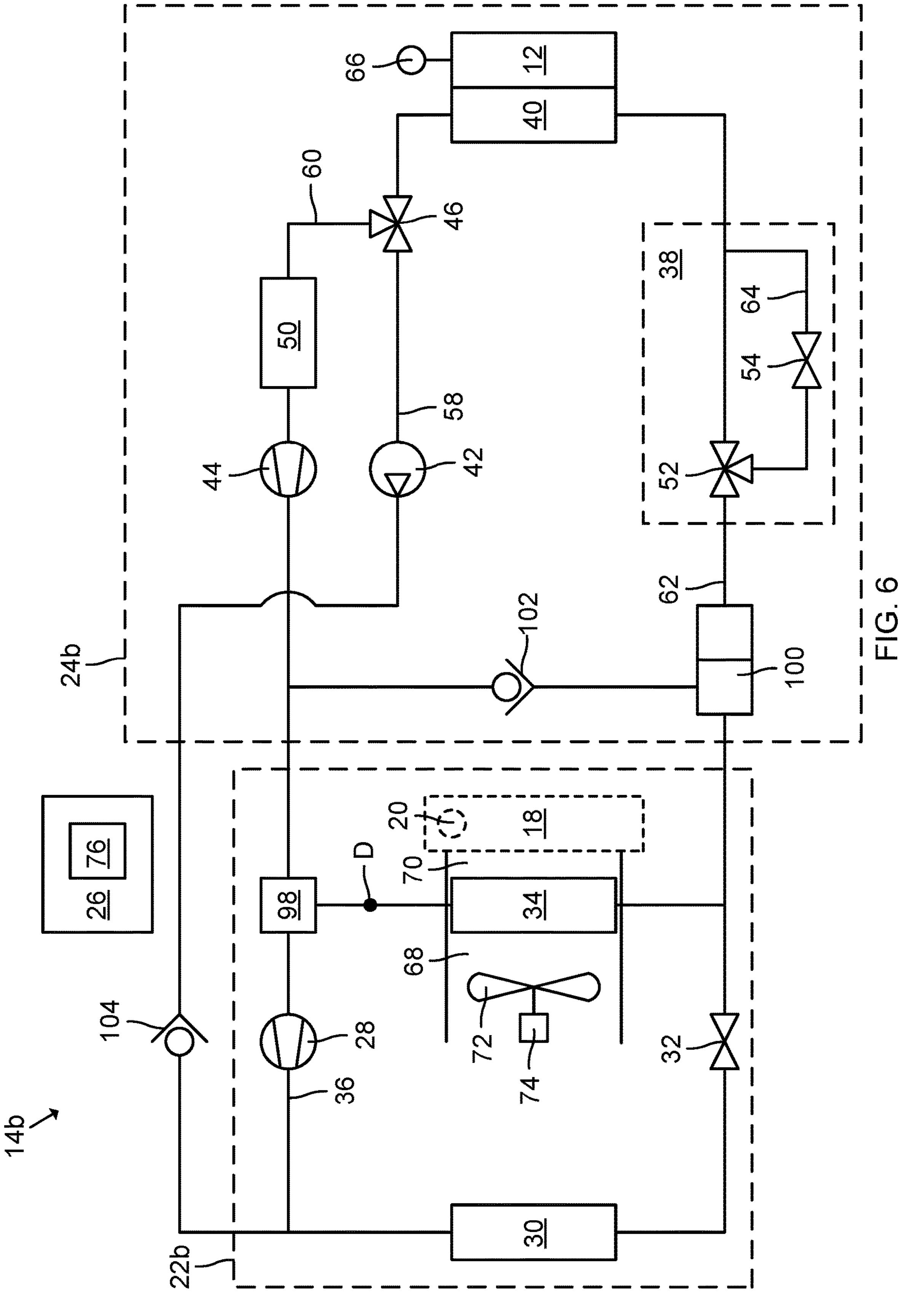
FIG. 6 is an exemplary view of a cooling system according to an example.

FIG. 6 is an exemplary view of a cooling system 14*b* according to an example. The cooling system 14*b* may be used as the cooling system 14 in the vehicle 10. Mainly differences of the cooling system 14*b* with respect to the cooling system 14*a* will be described.

The cooling system 14*b* of this example comprises a primary stage 22*b* and a secondary stage 24*b*. The primary stage 22*b* of this example comprises the primary compressor 28, the condenser 30 arranged downstream of the primary compressor 28, a primary expansion valve 32 arranged downstream of the primary compressor 28, and the evaporator 34 arranged downstream of the primary expansion valve 32. The primary expansion valve 32 is a further example of a primary pressure reducing device according to the disclosure.

The primary stage 22*b* of this example further comprises a mixer 98. The mixer 98 is arranged between the evaporator 34 and the primary compressor 28. The primary compressor 28, the condenser 30, the primary expansion valve 32, the evaporator 34 and the mixer 98 are arranged in the primary circuit 36.

The secondary stage 24*b* of this example comprises the secondary pressure reducing device 38, the cooling section 40, the pump 42, the secondary compressor 44, and the first valve device 46. In this example, the primary stage 22*b* and the secondary stage 24*b* are in fluid communication. Thus, a common refrigerant may be used in the primary stage 22*b* and the secondary stage 24*b*, such as R-134a refrigerant.

The secondary stage 24*b* of this example further comprises a flash chamber 100. The flash chamber 100 is a device that separates liquid and vapor refrigerant. The flash chamber 100 is arranged downstream of the primary expansion valve 32 and upstream of the secondary pressure reducing device 38.

The secondary stage 24*b* of this example further comprises a first one-way valve 102. The first one-way valve 102 is arranged downstream of the flash chamber 100 and upstream of the mixer 98.

The secondary stage 24*b* of this example further comprises a second one-way valve 104. In this example, the first line 58 extends from the cooling section 40, through the first valve device 46, through the pump 42, through the second one-way valve 104 and to the condenser 30. Moreover, in this example, the first bypass line 60 extends from the first valve device 46, through the optional phase separator 50, through the secondary compressor 44 and to the mixer 98.

Figure 7:
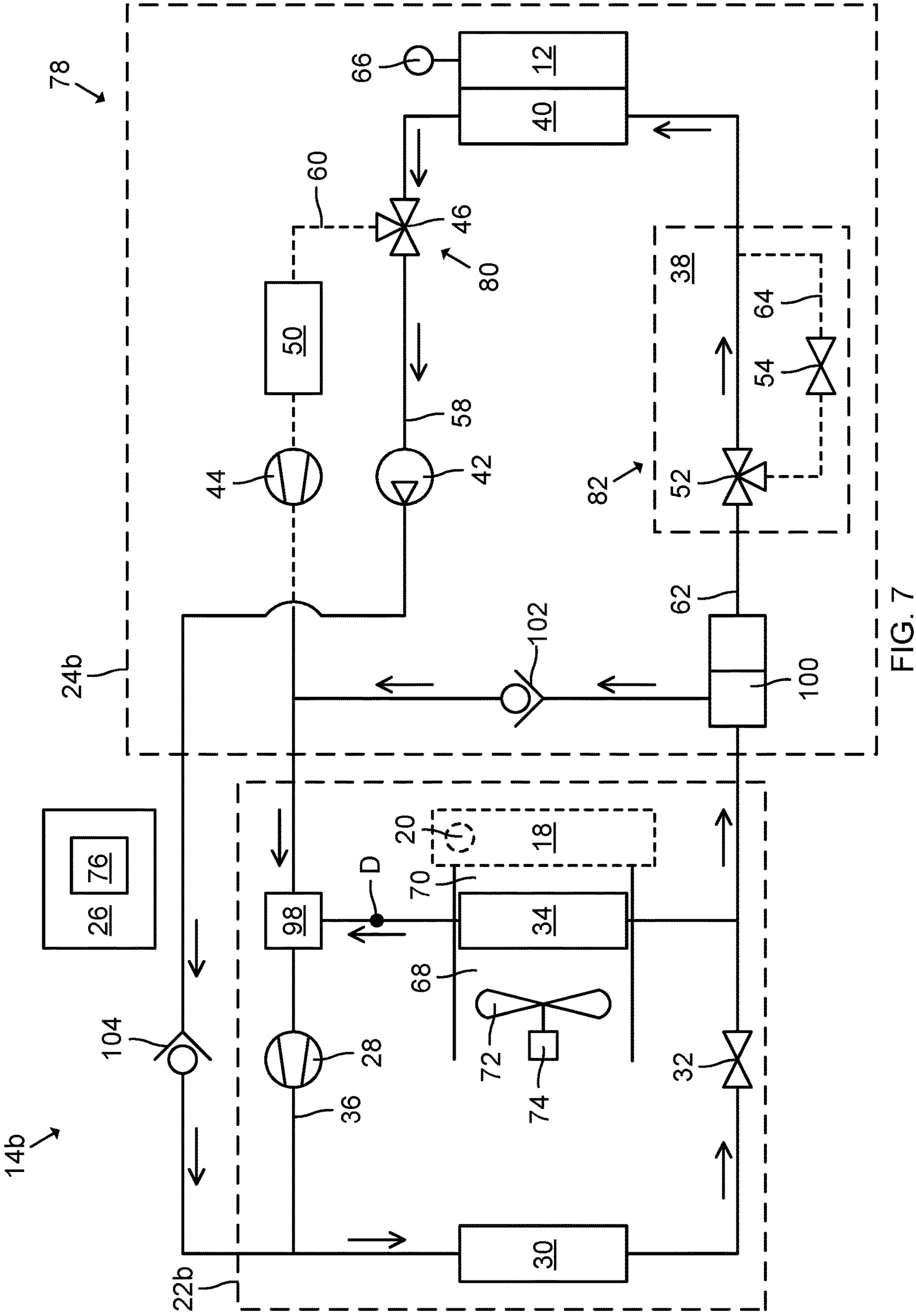
FIG. 7 is an exemplary view of the cooling system in FIG. 6 when a secondary stage operates in a first mode according to an example.

FIG. 7 is exemplary view of the cooling system 14*b* in FIG. 6. In FIG. 6, the processing circuitry 76 controls the secondary stage 24*b* to operate in a first mode 78 according to a further example.

In the primary circuit 36, the primary compressor 28 forces the refrigerant to the condenser 30. The refrigerant then reaches the primary expansion valve 32 downstream of the condenser 30. The refrigerant then reaches each of the evaporator 34 and the flash chamber 100 downstream of the primary expansion valve 32. The refrigerant from the evaporator 34 then reaches the mixer 98. The refrigerant from the mixer 98 then reaches the primary compressor 28. In the mixer 98, refrigerant from the evaporator 34 is mixed with refrigerant from the secondary stage 24*b*, here from the first one-way valve 102 in the first mode 78. The mixer 98 may thus be a device configured to mix a plurality of fluid inputs to provide a single fluid output, here to the primary compressor 28.

The flash chamber 100 separates refrigerant in the liquid phase from refrigerant in the vapor phase. The refrigerant in the liquid phase is led from the flash chamber 100 to the secondary pressure reducing device 38. The refrigerant in the vapor phase is led from the flash chamber 100 to the first one-way valve 102.

When the first valve device 46 adopts the first state 80 in the first mode 78, the refrigerant from the cooling section 40 is passed to the pump 42, and not to the secondary compressor 44. The refrigerant from the pump 42 is led in the first line 58 via the second one-way valve 104 to the condenser 30.

Figure 8:
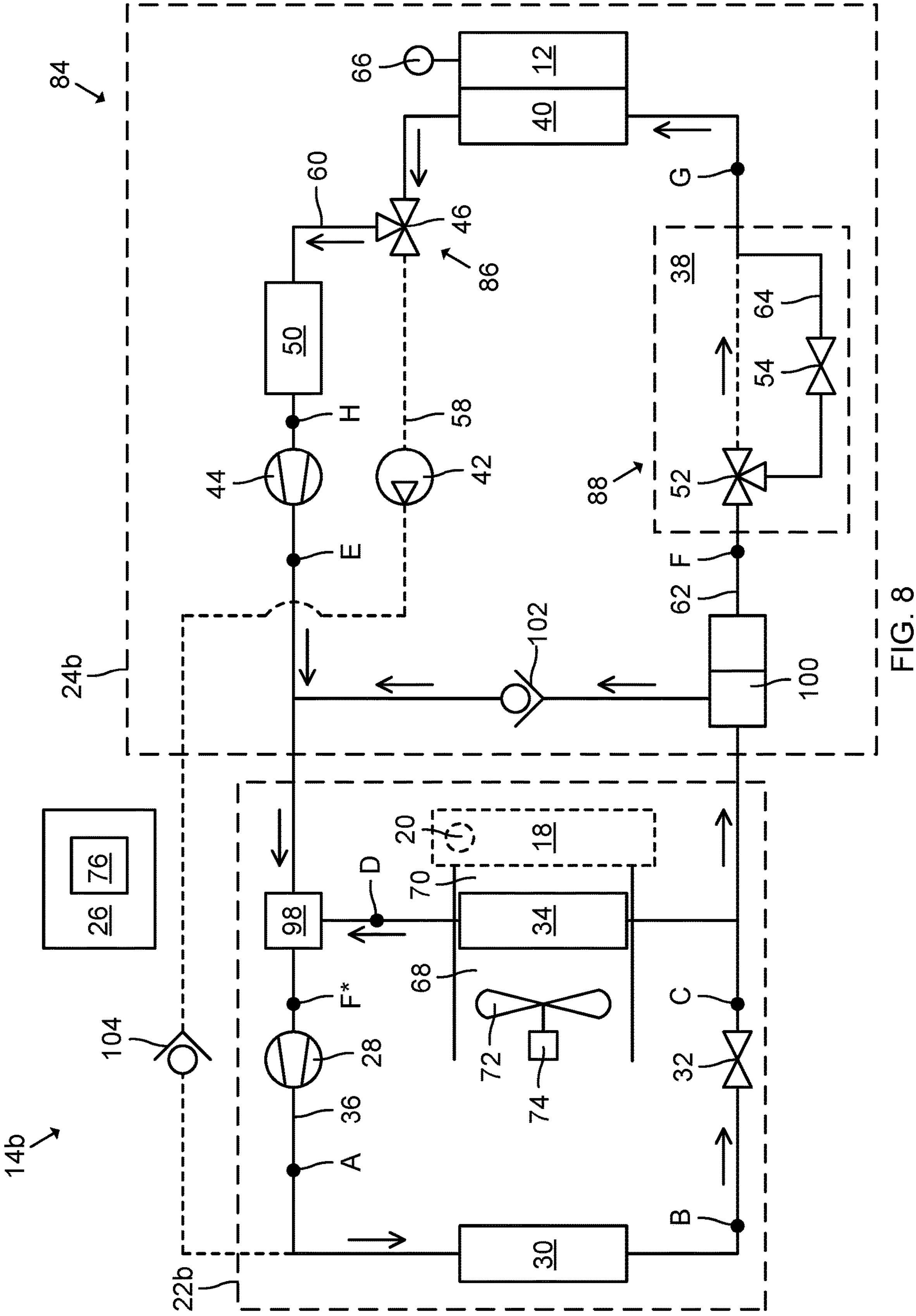
FIG. 8 is an exemplary view of the cooling system in FIG. 6 when the secondary stage operates in a second mode according to an example.

FIG. 8 is an exemplary view of the cooling system 14*b* in FIG. 6. In FIG. 8, the processing circuitry 76 controls the secondary stage 24*b* to operate in a second mode 84 according to a further example.

When the first valve device 46 adopts the second state 86 in the second mode 84, the first valve device 46 leads the refrigerant from the cooling section 40 into the first bypass line 60 where it reaches the secondary compressor 44, and here also the phase separator 50 upstream of the secondary compressor 44. A part of the first line 58 including the pump 42 is thereby bypassed. In the second mode 84, the secondary compressor 44 forces the refrigerant to the mixer 98.

FIG. 8 further shows a plurality of points A-H and F* of operation. The primary stage 22*b* comprises points A-D and F*. The secondary stage 24*b* comprises points E-H.

In the primary stage 22*b*, point A is between the primary compressor 28 and the condenser 30, point B is between the condenser 30 and the primary expansion valve 32, point C is downstream of the primary expansion valve 32 and upstream of each of the evaporator 34 and the flash chamber 100, point D is between the evaporator 34 and the mixer 98, and point F* is between the mixer 98 and the primary compressor 28. The refrigerant in the primary stage 22*b* undergoes a pressure increase in the primary compressor 28, condensation in the condenser 30, a pressure decrease in the primary expansion valve 32, vaporization in the evaporator 34, and a temperature increase in the mixer 98.

In the secondary stage 24*b*, point E is between the secondary compressor 44 and the mixer 98, point F is between the flash chamber 100 and the secondary pressure reducing device 38, point G is between the secondary pressure reducing device 38 and the cooling section 40, and point H is between the cooling section 40 and the secondary compressor 44, here between the phase separator 50 and the secondary compressor 44. The refrigerant in the secondary stage 24*b* undergoes a pressure increase in the secondary compressor 44, phase separation in the flash chamber 100, a pressure decrease in the secondary pressure reducing device 38 (here in the secondary expansion valve 54), and vaporization in the cooling section 40. Since the refrigerant from the secondary compressor 44 in the secondary stage 24*b* is led to the condenser 30 of the primary stage 22*b*, here via the mixer 98 and the primary compressor 28, the refrigerant conveyed by the secondary stage 24*b* is condensed in cooperation with the primary stage 22*b*. In the mixer 98, refrigerant from the evaporator 34 is mixed with refrigerant from the secondary stage 24*b*, here from the first one-way valve 102 and the 44 in the second mode 84.

Figure 9:
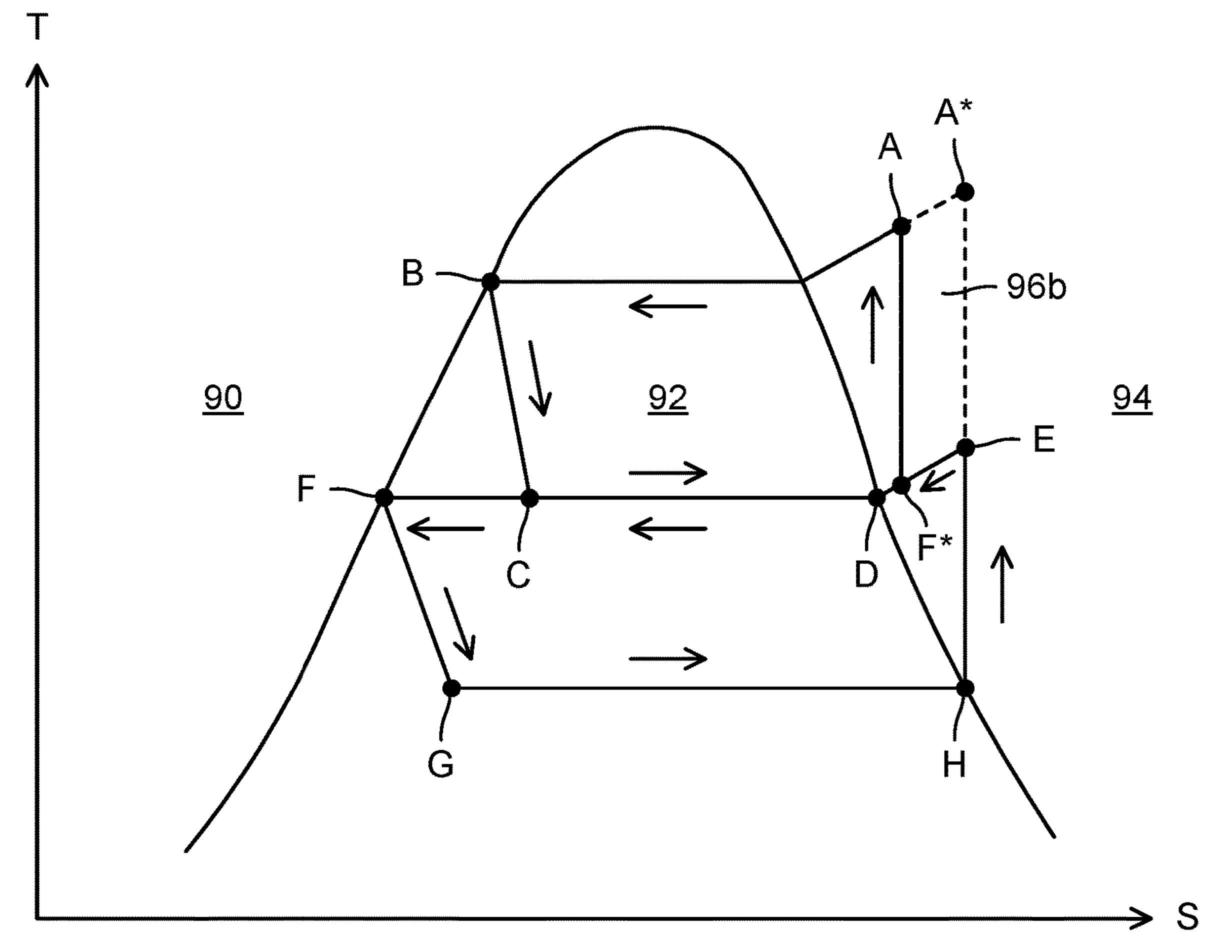
FIG. 9 is an exemplary view of a temperature-entropy diagram according to an example.

FIG. 9 is an exemplary view of a temperature-entropy diagram according to an example. More specifically, FIG. 9 shows the temperature T as a function of entropy S of the refrigerant in each of the primary and secondary stages 22*b*, 24*b*. In FIG. 9, the points A-D and F* of operation of the refrigerant in the primary stage 22*b* and the points E-H of operation of the refrigerant in the secondary stage 24*b* are shown. Due to the cooling system 14*b* comprising the primary compressor 28 in the primary stage 22*b* and the secondary compressor 44 in the secondary stage 24*b*, less work is required in comparison with if the pressure of the refrigerant would be increased from point H to point A* using a single compressor. The work reduction, illustrated by area 96*b* in FIG. 9, is however somewhat smaller than the work reduction illustrated by area 96*a* in FIG. 5.

Figure 10:
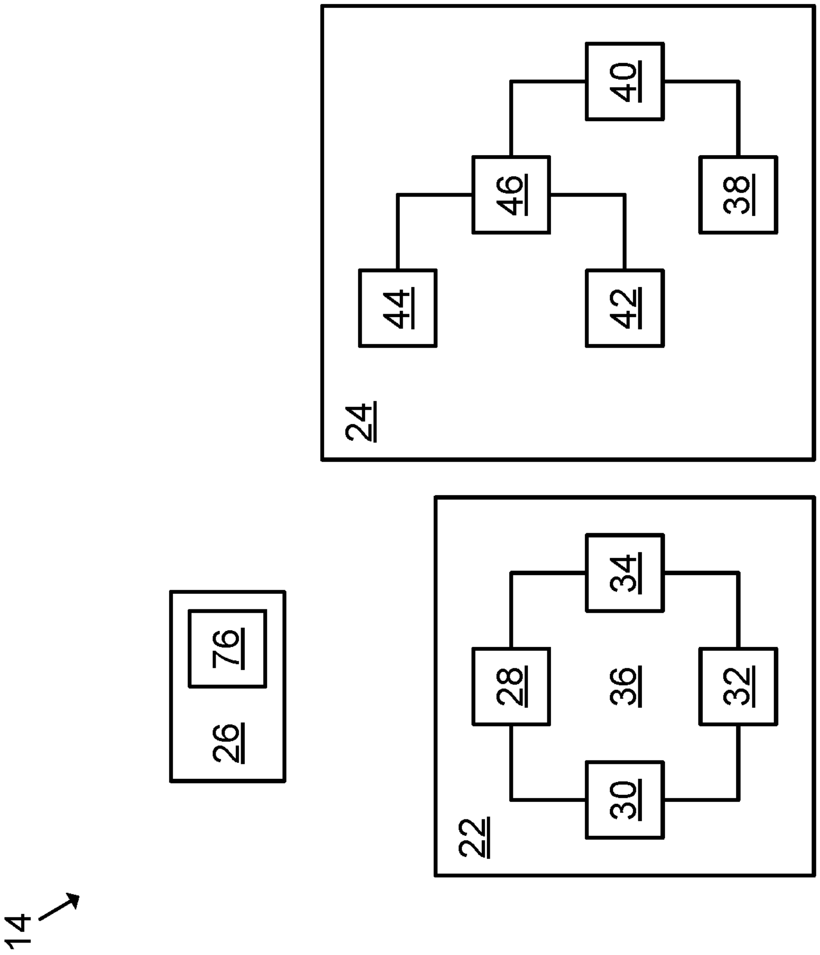
FIG. 10 is another view of FIG. 2, according to another example.

FIG. 10 is another view of FIG. 2, according to another example. FIG. 10 shows a cooling system 14 for cooling an electric storage device 12 in a vehicle 10, the cooling system 14 comprising a primary stage 22 including a primary compressor 28, a condenser 30 downstream of the primary compressor 28, a primary pressure reducing device 32 downstream of the condenser 30, and an evaporator 34 downstream of the primary pressure reducing device 32 arranged in a primary circuit 36; a secondary stage 24 arranged to convey a refrigerant, the secondary stage 24 including a secondary pressure reducing device 38 configured to adopt a passive state 82, and an active state 88 providing a larger pressure drop of the refrigerant than in the passive state 82, a cooling section 40 downstream of the secondary pressure reducing device 38 for cooling the electric storage device 12, a pump 42, a secondary compressor 44 arranged in parallel with the pump 42, and a valve device 46 downstream of the cooling section 40 arranged to selectively direct the refrigerant to the pump 42 or to the secondary compressor 44; and a computer system 26 comprising processing circuitry 76 configured to control the secondary stage 24 to operate in a first mode 78 by controlling the secondary pressure reducing device 38 to adopt the passive state 82, and by controlling the valve device 46 to direct the refrigerant to the pump 42; and control the secondary stage 24 to operate in a second mode 84 by controlling the secondary pressure reducing device 38 to adopt the active state 88, and by controlling the valve device 46 to direct the refrigerant to the secondary compressor 44; wherein the cooling system 14 is configured such that in the second mode 84, the refrigerant conveyed by the secondary stage 24 is condensed in cooperation with the primary stage 22.

Figure 11:
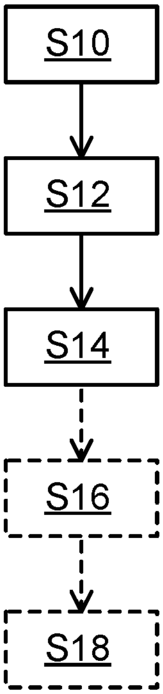
FIG. 11 is a flowchart of a method of controlling a cooling system according to an example.

FIG. 11 is a flowchart of a method of controlling a cooling system according to an example. The method comprises providing S10 cooling system 14; 14*a*; 14*b* comprising: a primary stage 22; 22*a*; 22*b* including a primary compressor 28, a condenser 30 downstream of the primary compressor 28, a primary pressure reducing device 32; 32*a* downstream of the condenser 30, and an evaporator 34 downstream of the primary pressure reducing device 32; 32*a* arranged in a primary circuit 36; and a secondary stage 24; 24*a*; 24*b* arranged to convey a refrigerant, the secondary stage 24; 24*a*; 24*b* including a secondary pressure reducing device 38 configured to adopt a passive state 82, and an active state 88 providing a larger pressure drop of the refrigerant than in the passive state 82, a cooling section 40 downstream of the secondary pressure reducing device 38 for cooling the electric storage device 12, a pump 42, a secondary compressor 44 arranged in parallel with the pump 42, and a valve device 46 downstream of the cooling section 40 arranged to selectively direct the refrigerant to the pump 42 or to the secondary compressor 44.

The method further comprises controlling S12, by processing circuitry 76 of a computer system 26, the secondary stage 24; 24*a*; 24*b* to operate in a first mode 78 by controlling the secondary pressure reducing device 38 to adopt the passive state 82, and by controlling the valve device 46 to direct the refrigerant to the pump 42.

The method further comprises controlling S14, by the processing circuitry 76, the secondary stage 24; 24*a*; 24*b* to operate in a second mode 84 by controlling the secondary pressure reducing device 38 to adopt the active state 88, and by controlling the valve device 46 directs the refrigerant to the secondary compressor 44. In the second mode 84, the refrigerant conveyed by the secondary stage 24; 24*a*; 24*b* is condensed in cooperation with the primary stage 22; 22*a*; 22*b*.

The method of this example further comprises controlling S16, by the processing circuitry 76, the secondary stage 24;

24*a*; 24*b* to operate in the second mode 84 in response to data indicative of a thermal runaway in the electric storage device 12.

The method of this example further comprises controlling S18, by the processing circuitry 76, the fan 72 to blow air through the duct 68 having the outlet 70 towards the passenger compartment 18 of the vehicle 10, wherein the evaporator 34 is arranged to cool air flowing in the duct 68.

Figure 12:
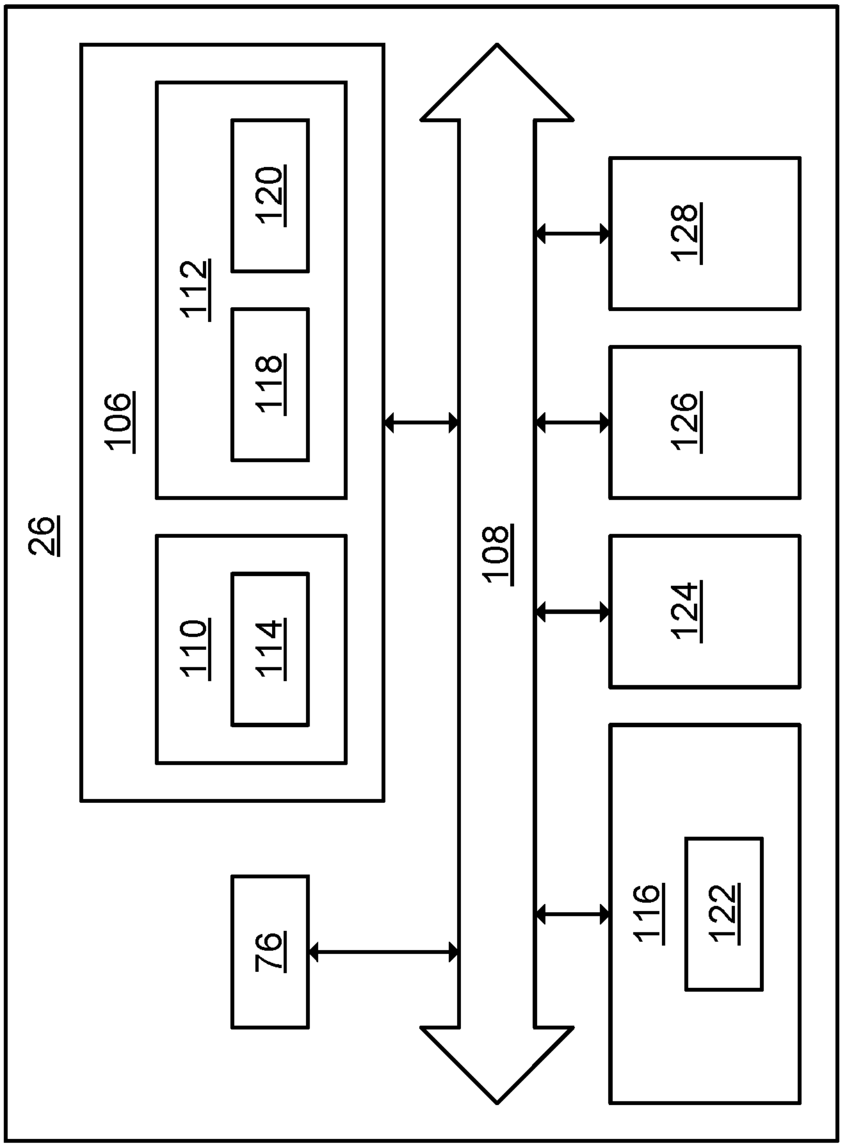
FIG. 12 is an exemplary view of a computer system according to an example.

FIG. 12 is a schematic diagram of the computer system 26 for implementing examples disclosed herein. The computer system 26 is adapted to execute instructions from a computer-readable medium to perform these and/or any of the functions or processing described herein. The computer system 26 may be connected (e.g., networked) to other machines in a LAN, an intranet, an extranet, or the Internet. While only a single device is illustrated, the computer system 26 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 26 may comprise at least one computing device or electronic device capable of including firmware, hardware, and/or executing software instructions to implement the functionality described herein. The computer system 26 may include the processing circuitry 76 (e.g., processing circuitry including one or more processor devices or control units), a memory 106, and a system bus 108. The computer system 26 may include at least one computing device having the processing circuitry 76. The system bus 108 provides an interface for system components including, but not limited to, the memory 106 and the processing circuitry 76. The processing circuitry 76 may include any number of hardware components for conducting data or signal processing or for executing computer code stored in memory 106. The processing circuitry 76 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry may further include computer executable code that controls operation of the programmable device.

The system bus 108 may be any of several types of bus structures that may further interconnect to a memory bus (with or without a memory controller), a peripheral bus, and/or a local bus using any of a variety of bus architectures. The memory 106 may be one or more devices for storing data and/or computer code for completing or facilitating methods described herein. The memory 106 may include database components, object code components, script components, or other types of information structure for supporting the various activities herein. Any distributed or local memory device may be utilized with the systems and methods of this description. The memory 106 may be communicably connected to the processing circuitry 76 (e.g., via a circuit or any other wired, wireless, or network connection) and may include computer code for executing one or more processes described herein. The memory 106 may include non-volatile memory 110 (e.g., read-only memory (ROM), erasable programmable read-only memory (EPROM), electrically erasable programmable read-only memory (EEPROM), etc.), and volatile memory 112 (e.g., random-access memory (RAM)), or any other medium which can be used to carry or store desired program code in the form of machine-executable instructions or data structures and which can be accessed by a computer or other machine with a processing circuitry 76. A basic input/output system (BIOS) 114 may be stored in the non-volatile memory 110 and can include the basic routines that help to transfer information between elements within the computer system 26.

The computer system 26 may further include or be coupled to a non-transitory computer-readable storage medium such as the storage device 116, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 116 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 116 and/or in the volatile memory 112, which may include an operating system 118 and/or one or more program modules 120. All or a portion of the examples disclosed herein may be implemented as a computer program 122 stored on a transitory or non-transitory computer-usable or computer-readable storage medium (e.g., single medium or multiple media), such as the storage device 116, which includes complex programming instructions (e.g., complex computer-readable program code) to cause the processing circuitry 76 to carry out the actions described herein. Thus, the computer-readable program code of the computer program 122 can comprise software instructions for implementing the functionality of the examples described herein when executed by the processing circuitry 76. In some examples, the storage device 116 may be a computer program product (e.g., readable storage medium) storing the computer program 122 thereon, where at least a portion of a computer program 122 may be loadable (e.g., into a processor) for implementing the functionality of the examples described herein when executed by the processing circuitry 76. The processing circuitry 76 may serve as a controller or control system for the computer system 26 that is to implement the functionality described herein.

The computer system 26 may include an input device interface 124 configured to receive input and selections to be communicated to the computer system 26 when executing instructions, such as from a keyboard, mouse, touch-sensitive surface, etc. Such input devices may be connected to the processing circuitry 76 through the input device interface 124 coupled to the system bus 108 but can be connected through other interfaces such as a parallel port, an Institute of Electrical and Electronic Engineers (IEEE) 1394 serial port, a Universal Serial Bus (USB) port, an IR interface, and the like. The computer system 26 may include an output device interface 126 configured to forward output, such as to a display, a video display unit (e.g., a liquid crystal display (LCD) or a cathode ray tube (CRT)). The computer system 26 may include a communications interface 128 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A cooling system 14; 14*a*; 14*b* for cooling an electric storage device 12 in a vehicle 10, the cooling system 14; 14*a*; 14*b* comprising a primary stage 22; 22*a*; 22*b* including a primary compressor 28, a condenser 30 downstream of the primary compressor 28, a primary pressure reducing device 32; 32*a* downstream of the condenser 30, and an evaporator 34 downstream of the primary pressure reducing device 32; 32*a* arranged in a primary circuit 36; a secondary stage 24; 24*a*; 24*b* arranged to convey a refrigerant, the secondary stage 24; 24*a*; 24*b* including a secondary pressure reducing device 38 configured to adopt a passive state 82, and an active state 88 providing a larger pressure drop of the refrigerant than in the passive state 82, a cooling section 40 downstream of the secondary pressure reducing device 38 for cooling the electric storage device 12, a pump 42, a secondary compressor 44 arranged in parallel with the pump 42, and a valve device 46 downstream of the cooling section 40 arranged to selectively direct the refrigerant to the pump 42 or to the secondary compressor 44; and a computer system 26 comprising processing circuitry 76 configured to control the secondary stage 24; 24*a*; 24*b* to operate in a first mode 78 by controlling the secondary pressure reducing device 38 to adopt the passive state 82, and by controlling the valve device 46 to direct the refrigerant to the pump 42; and control the secondary stage 24; 24*a*; 24*b* to operate in a second mode 84 by controlling the secondary pressure reducing device 38 to adopt the active state 88, and by controlling the valve device 46 to direct the refrigerant to the secondary compressor 44; wherein the cooling system 14; 14*a*; 14*b* is configured such that in the second mode 84, the refrigerant conveyed by the secondary stage 24; 24*a*; 24*b* is condensed in cooperation with the primary stage 22; 22*a*; 22*b*.

Example 2: The cooling system 14; 14*a*; 14*b* of example 1, wherein in the second mode 84, a pressure G immediately downstream of the secondary pressure reducing device 38 is at least 20% lower than a pressure C immediately downstream of the primary pressure reducing device 32; 32*a*.

Example 3: The cooling system 14; 14*a*; 14*b* of any of the preceding examples, wherein in the second mode 84, the primary stage 22; 22*a*; 22*b* operates in a primary pressure range and the secondary stage 24; 24*a*; 24*b* operates in a secondary pressure range, and wherein all pressures of the primary pressure range are equal to or higher than all pressures of the secondary pressure range.

Example 4: The cooling system 14; 14*a*; 14*b* of any of the preceding examples, wherein the processing circuitry 76 is configured to control the secondary stage 24; 24*a*; 24*b* to operate in the second mode 84 based on data indicative of a thermal runaway in the electric storage device 12.

Example 5: The cooling system 14; 14*a*; 14*b* of any of the preceding examples, further comprising a duct 68 having an outlet 70 for blowing air towards a passenger compartment 18; wherein the evaporator 34 is arranged to cool air flowing in the duct 68.

Example 6: The cooling system 14*a* according to any of the preceding examples, wherein the secondary pressure reducing device 38, the cooling section 40, the pump 42, the secondary compressor 44 and the valve device 46 are arranged in a secondary circuit 48, wherein the refrigerant is a first refrigerant contained in the secondary circuit 48, and wherein the primary circuit 36 contains a second refrigerant, fluidically separated from the first refrigerant.

Example 7: A vehicle 10 comprising the cooling system 14; 14*a*; 14*b* according to any of the preceding examples.

Example 8: The vehicle 10 of example 7, further comprising a passenger compartment 18, wherein the vehicle 10 comprises the cooling system 14; 14*a*; 14*b* according to example 5.

Example 9: A method of controlling a cooling system 14; 14*a*; 14*b* for cooling an electric storage device 12 in a vehicle 10, the method comprising providing S10 a cooling system 14; 14*a*; 14*b* comprising a primary stage 22; 22*a*; 22*b* including a primary compressor 28, a condenser 30 downstream of the primary compressor 28, a primary pressure reducing device 32; 32*a* downstream of the condenser 30, and an evaporator 34 downstream of the primary pressure reducing device 32; 32*a* arranged in a primary circuit 36; and a secondary stage 24; 24*a*; 24*b* arranged to convey a refrigerant, the secondary stage 24; 24*a*; 24*b* including a secondary pressure reducing device 38 configured to adopt a passive state 82, and an active state 88 providing a larger pressure drop of the refrigerant than in the passive state 82, a cooling section 40 downstream of the secondary pressure reducing device 38 for cooling the electric storage device 12, a pump 42, a secondary compressor 44 arranged in parallel with the pump 42, and a valve device 46 downstream of the cooling section 40 arranged to selectively direct the refrigerant to the pump 42 or to the secondary compressor 44; controlling S12, by processing circuitry 76 of a computer system 26, the secondary stage 24; 24*a*; 24*b* to operate in a first mode 78 by controlling the secondary pressure reducing device 38 to adopt the passive state 82, and by controlling the valve device 46 to direct the refrigerant to the pump 42; and controlling S14, by the processing circuitry 76, the secondary stage 24; 24*a*; 24*b* to operate in a second mode 84 by controlling the secondary pressure reducing device 38 to adopt the active state 88, and by controlling the valve device 46 to direct the refrigerant to the secondary compressor 44; wherein in the second mode 84, the refrigerant conveyed by the secondary stage 24; 24*a*; 24*b* is condensed in cooperation with the primary stage 22; 22*a*; 22*b*.

Example 10: The method of example 9, wherein in the second mode 84, a pressure G immediately downstream of the secondary pressure reducing device 38 is at least 20% lower than a pressure C immediately downstream of the primary pressure reducing device 32; 32*a*.

Example 11: The method of example 9 or 10, wherein in the second mode 84, the primary stage 22; 22*a*; 22*b* operates in a primary pressure range and the secondary stage 24; 24*a*; 24*b* operates in a secondary pressure range, and wherein all pressures of the primary pressure range are equal to or higher than all pressures of the secondary pressure range.

Example 12: The method of any of examples 9 to 11, further comprising controlling S16, by the processing circuitry 76, the secondary stage 24; 24*a*; 24*b* to operate in the second mode 84 in response to data indicative of a thermal runaway in the electric storage device 12.

Example 13: The method of any of examples 9 to 12, further comprising controlling S18, by the processing circuitry 76, a fan 72 to blow air through a duct 68 having an outlet 70 towards a passenger compartment 18 of the vehicle 10, wherein the evaporator 34 is arranged to cool air flowing in the duct 68.

Example 14: The method of any of examples 9 to 13, wherein the secondary pressure reducing device 38, the cooling section 40, the pump 42, the secondary compressor 44 and the valve device 46 are arranged in a secondary circuit 48, wherein the refrigerant is a first refrigerant contained in the secondary circuit 48, and wherein the primary circuit 36 contains a second refrigerant, fluidically separated from the first refrigerant.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, operations, elements, and/or components, but do not preclude the presence or addition of one or more other features, integers, actions, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A cooling system for cooling an electric storage device in a vehicle, the cooling system comprising:

a primary stage including a primary compressor, a condenser downstream of the primary compressor, a primary pressure reducing device downstream of the condenser, and an evaporator downstream of the primary pressure reducing device arranged in a primary circuit;

a secondary stage arranged to convey a refrigerant, the secondary stage including a secondary pressure reducing device configured to adopt a passive state, and an active state providing a larger pressure drop of the refrigerant than in the passive state, a cooling section downstream of the secondary pressure reducing device for cooling the electric storage device, a pump, a secondary compressor arranged in parallel with the pump, and a valve device downstream of the cooling section arranged to selectively direct the refrigerant to the pump or to the secondary compressor; and a computer system comprising processing circuitry configured to:

control the secondary stage to operate in a first mode by controlling the secondary pressure reducing device to adopt the passive state, and by controlling the valve device to direct the refrigerant to the pump; and control the secondary stage to operate in a second mode by controlling the secondary pressure reducing device to adopt the active state, and by controlling the valve device to direct the refrigerant to the secondary compressor;

wherein the cooling system is configured such that in the second mode, the refrigerant conveyed by the secondary stage is condensed in cooperation with the primary stage.

2. The cooling system of claim 1, wherein in the second mode, a pressure between the secondary pressure reducing device and the cooling section is at least 20% lower than a pressure between the first primary expansion valve and the evaporator.

3. The cooling system of claim 1, wherein in the second mode, the primary stage operates in a primary pressure range and the secondary stage operates in a secondary pressure range, and wherein all pressures of the primary pressure range are equal to or higher than all pressures of the secondary pressure range.

4. The cooling system of claim 1, wherein the processing circuitry is configured to control the secondary stage to operate in the second mode based on data indicative of a thermal runaway in the electric storage device.

5. The cooling system of claim 1, further comprising a duct having an outlet for blowing air towards a passenger compartment; wherein the evaporator is arranged to cool air flowing in the duct.

6. The cooling system according to claim 1, wherein the secondary pressure reducing device, the cooling section, the pump, the secondary compressor and the valve device are arranged in a secondary circuit, wherein the refrigerant is a first refrigerant contained in the secondary circuit, and wherein the primary circuit contains a second refrigerant, fluidically separated from the first refrigerant.

7. A vehicle, comprising: a cooling system for cooling an electric storage device in the vehicle, the cooling system comprising:

a primary stage including a primary compressor, a condenser downstream of the primary compressor, a primary pressure reducing device downstream of the condenser, and an evaporator downstream of the primary pressure reducing device arranged in a primary circuit;

a secondary stage arranged to convey a refrigerant, the secondary stage including a secondary pressure reducing device configured to adopt a passive state, and an active state providing a larger pressure drop of the refrigerant than in the passive state, a cooling section downstream of the secondary pressure reducing device for cooling the electric storage device, a pump, a secondary compressor arranged in parallel with the pump, and a valve device downstream of the cooling section arranged to selectively direct the refrigerant to the pump or to the secondary compressor; and a computer system comprising processing circuitry configured to:

control the secondary stage to operate in a first mode by controlling the secondary pressure reducing device to adopt the passive state, and by controlling the valve device to direct the refrigerant to the pump; and control the secondary stage to operate in a second mode by controlling the secondary pressure reducing device to adopt the active state, and by controlling the valve device to direct the refrigerant to the secondary compressor;

wherein the cooling system is configured such that in the second mode, the refrigerant conveyed by the secondary stage is condensed in cooperation with the primary stage.

8. The vehicle of claim 7, further comprising a passenger compartment, wherein the vehicle comprises the cooling system.

9. A method of controlling a cooling system for cooling an electric storage device in a vehicle, the method comprising:

providing the cooling system comprising:

a primary stage including a primary compressor, a condenser downstream of the primary compressor, a primary pressure reducing device downstream of the condenser, and an evaporator downstream of the primary pressure reducing device arranged in a primary circuit; and a secondary stage arranged to convey a refrigerant, the secondary stage including a secondary pressure reducing device configured to adopt a passive state, and an active state providing a larger pressure drop of the refrigerant than in the passive state, a cooling section downstream of the secondary pressure reducing device for cooling the electric storage device, a pump, a secondary compressor arranged in parallel with the pump, and a valve device downstream of the cooling section arranged to selectively direct the refrigerant to the pump or to the secondary compressor;

controlling, by processing circuitry of a computer system, the secondary stage to operate in a first mode by controlling the secondary pressure reducing device to adopt the passive state, and by controlling the valve device to direct the refrigerant to the pump; and controlling, by the processing circuitry, the secondary stage to operate in a second mode by controlling the secondary pressure reducing device to adopt the active state, and by controlling the valve device to direct the refrigerant to the secondary compressor;

wherein in the second mode, the refrigerant conveyed by the secondary stage is condensed in cooperation with the primary stage.

10. The method of claim 9, wherein in the second mode, a pressure between the secondary pressure reducing device and cooling section is at least 20% lower than a pressure between the first primary expansion valve and the evaporator.

11. The method of claim 9, wherein in the second mode, the primary stage operates in a primary pressure range and the secondary stage operates in a secondary pressure range, and wherein all pressures of the primary pressure range are equal to or higher than all pressures of the secondary pressure range.

12. The method of claim 9, further comprising controlling, by the processing circuitry, the secondary stage to operate in the second mode in response to data indicative of a thermal runaway in the electric storage device.

13. The method of claim 9, further comprising controlling, by the processing circuitry, a fan to blow air through a duct having an outlet towards a passenger compartment of the vehicle, wherein the evaporator is arranged to cool air flowing in the duct.

14. The method of claim 9, wherein the secondary pressure reducing device, the cooling section, the pump, the secondary compressor and the valve device are arranged in a secondary circuit, wherein the refrigerant is a first refrigerant contained in the secondary circuit, and wherein the primary circuit contains a second refrigerant, fluidically separated from the first refrigerant.

* * * * *